(12) United States Patent
Raad et al.

(10) Patent No.: US 7,599,834 B2
(45) Date of Patent: Oct. 6, 2009

(54) METHOD AND APPARATUS OF VOICE MIXING FOR CONFERENCING AMONGST DIVERSE NETWORKS

(75) Inventors: Mohammed Raad, Cringila (AU); Jianwei Wang, Killarney Heights (AU); Marwan A. Jabri, Tiburon, CA (US)

(73) Assignee: Dilithium Netowkrs, Inc., Petaluma, CA (US)

( * ) Notice: Subject to any disclaimer, the term of this patent is extended or adjusted under 35 U.S.C. 154(b) by 151 days.

(21) Appl. No.: 11/564,794

(22) Filed: Nov. 29, 2006

(65) Prior Publication Data

US 2007/0299661 A1 Dec. 27, 2007

Related U.S. Application Data

(60) Provisional application No. 60/740,823, filed on Nov. 29, 2005.

(51) Int. Cl.
*G10L 19/04* (2006.01)
*H04M 3/56* (2006.01)

(52) U.S. Cl. .................... 704/219; 379/202.01; 704/221

(58) Field of Classification Search ................ 704/219, 704/221; 379/202.1, 202.01
See application file for complete search history.

(56) References Cited

U.S. PATENT DOCUMENTS

| | | |
|---|---|---|
| 4,000,377 A | 12/1976 | Sharret |
| 4,022,981 A | 5/1977 | McLaughlin et al. |
| 4,022,991 A | 5/1977 | Kelly et al. |
| 4,031,328 A | 6/1977 | Pitroda |
| 4,054,755 A | 10/1977 | Lee et al. |
| 4,054,757 A | 10/1977 | LeJay |
| 4,139,731 A | 2/1979 | Hashemi et al. |
| 4,257,120 A | 3/1981 | Funderburk et al. |
| 4,267,593 A | 5/1981 | Regan et al. |
| 4,271,502 A | 6/1981 | Goutmann et al. |
| 4,274,155 A | 6/1981 | Funderburk et al. |
| 4,387,457 A | 6/1983 | Munter |
| 4,456,792 A | 6/1984 | Courtney-Pratt |
| 5,390,177 A | 2/1995 | Nahumi |
| 6,463,414 B1 | 10/2002 | Su et al. |
| 6,829,579 B2 | 12/2004 | Jabri et al. |
| 6,956,828 B2 | 10/2005 | Simard et al. |
| 7,006,456 B2 | 2/2006 | Rabipour et al. |
| 7,006,616 B1 * | 2/2006 | Christofferson et al. ................ 379/202.01 |
| 7,012,630 B2 * | 3/2006 | Curry et al. ............... 348/14.08 |
| 7,385,940 B1 * | 6/2008 | Harrow et al. ............... 370/267 |
| 2003/0135368 A1 | 7/2003 | Zinser et al. |
| 2005/0102137 A1 | 5/2005 | Zinser et al. |

OTHER PUBLICATIONS

International Search Report and Written Opinion of PCT Application No. PCT/US06/61354, mailed Sep. 10, 2008, 10 pages total.

* cited by examiner

*Primary Examiner*—Talivaldis Ivars Smits
(74) *Attorney, Agent, or Firm*—Townsend and Townsend and Crew LLP

(57) ABSTRACT

A conferencing system is provided that utilizes both time domain signal mixing and direct signal fast transcoding. An exemplary embodiment of the present invention utilizes both time domain signal mixing and direct signal fast transcoding to process a bit-stream from a same channel during a conference.

39 Claims, 15 Drawing Sheets

METHOD AND APPARATUS OF VOICE MIXING FOR CONFERENCING AMONGST DIVERSE NETWORKS

CROSS-REFERENCES TO RELATED APPLICATIONS

This application claims priority to U.S. Provisional Patent Application No. 60/740,823, filed Nov. 29, 2005, which is incorporated by reference herein for all purposes.

BACKGROUND OF THE INVENTION

The present invention relates generally to processing telecommunications signals. More particularly, the invention provides a method and apparatus for voice transmixing of a number of voice compression bitstreams of different data rate encoding methods. Merely by way of example, the invention has been applied to voice transmixing in systems that employ multi-rate or multi-mode CELP based voice compression codecs, but it would be recognized that the invention may also include other applications.

This invention relates to speech conferencing. Conferencing has been a feature of PSTN services for more than two decades. In fact there are patents that date back to the early 1970s that outline circuits that allow analogue phone signals to be mixed into a total signal and transmitted to the non-speaking participants (U.S. Pat. Nos. 4,022,981, 4,022,991 and 4,031,328 are only three examples of such patents and FIG. 1 illustrates a digital version of such an apparatus, FIG. 2 illustrates a similar apparatus from the prior art (U.S. Pat. No. 6,463,414) that allows each conference channel to use a different voice compression scheme).

The early work was focused on summing circuits that would be part of a conference bridge. Large conferences could also be handled in a number of ways most of which were hardware circuits (see for example U.S. Pat. No. 4,000, 377). The focus of much of that work was how PCM "coded" speech signals could be extracted from a Time Division Multiple-access (TDM) line, summed without causing any overflow and then re-placed on that line going to the non-speakers. FIG. 3 shows a sample prior art apparatus that can be used to determine which of the contributing conference channels is to be chosen to be passed on to the listener.

The method of choosing a speaker has always been a major issue for inventors concerned with the development of conferencing technology (see for example U.S. Pat. Nos. 4,054, 755, 4,139,731, 4,257,120, 4,267,593, 4,274,155, 4,387,457 and 4,456,792). It was recognized at an early stage that typically when there are more than three conferees then people tend to be more conservative in how much they speak and so it was speculated that in most cases there is only a single person speaking. If such an assumption holds then it was interpolated that the conference can merely be a switching circuit that allows a single channel's input to be connected to all the other channel's outputs if the channel is determined to belong to a speaker. As such, a number of patented solutions to the conferencing problem included speaker detection using an energy measure. Simply put, the loudest speaker won the floor (see the previously listed U.S. Patents and FIG. 3 for an illustration of such an apparatus).

However, it was also recognized by a number of inventors in the field that the case of a single speaker did not always hold and that people did sometimes interrupt one another. It was also recognized that loud noise can sometimes take the floor from actual speakers. Although such a problem has existed for decades it was only recently that people have proposed the use of a Voice Activity Detection (VAD) algorithm to determine if there's actual speech on the incoming line (such a proposal has been made in U.S. Patent Applications Nos. 2003/0135368 and 2005/0102137). A VAD algorithm can take different forms, however, to be effective it must take into account both the time domain characteristics of speech as well as the frequency domain characteristics. In this context, the term "characteristics" refers to statistical as well as energy features of the signal.

In the recently proposed work (the two previously listed patent applications, 2005/0102137 and 2003/0135368, as well as U.S. Pat. No. 5,390,177) the VAD used is either an energy centric approach or a compression domain VAD approach. In either case, no mention is made of the error handling. VAD algorithms (like all signal detection algorithms) have a margin of error under which they operate. In some cases the erroneous detection of speech can be as high as 25%. That means speech is detected where there is no speech (actually VAD algorithms are deliberately constructed to be biased towards speech to ensure none is missed) which in turn means confusion for the speech conferencing tool as to which channels should be given the floor.

In the prior art there has also been concern about the quality of tandeming coders in the conferencing process. In this context, "tandeming" refers to the placement of speech codecs (encoder and decoder) end to end such that speech is coded and decoded using one specified coder and then re-encoded and re-decoded using a different coder, or the same coder (an apparatus that utilizes such an operation is illustrated in FIG. 2 where the conferees are accessing the same conference from a number of different networks and so encoders and decoders must be used on each channel). The concern is that once decoding has occurred, re-encoding the speech means a multiplicative effect of quality loss. That is why a number of proposed solutions have focused on the use of switching rather than tandeming (see for example U.S. Pat. Nos. 4,022,981, 4,054,757, 4,271,502 as well as U.S. Patent Application Nos. 2003/0135368 and 2005/0102137). In such solutions, a single speaker would be heard by the listening channels (with a number of variations on the same theme). However, in such cases other conferee's input is lost or not heard by all the listening participants. It is also apparent that when different compression standards are used by the input channels, the conversion from input standard to output standard must also be handled. In short, a switching solution cannot handle a situation where the input standard is different to the output standard and maintain the claimed quality advantage.

Recently, there has been some prior art published that proposed solutions for such cases based on compression level transcoding, such proposals have been made in U.S. Patent Application Nos. 2003/0135368 and 2005/0102137. Yet even in such cases there are restrictions placed on the user equipment (specifically, the end user needs to be able to receive multiple bit-streams in order to hear more than a single speaker).

SUMMARY OF THE INVENTION

In order to address the short-comings of the prior art in this field, this invention is a combination of time domain signal mixing and fast transcoding, where fast transcoding refers to methods as generally described in U.S. Pat. No. 6,829,579 or similar schemes. The input channels may carry signals (such as speech) compressed in any format and so a major short coming of the prior art has been addressed. Each input channel is partially decoded or "unpacked" and applied to a channel activity module (which in the case of speech would mean the use of a VAD algorithm). There are no restrictions on the channel activity detector that can be used. The input channels are synchronized such that there are at least two frames buffered from each channel, and a decision is made on whether the entire buffer carries an active signal, where an active signal means a signal that may be sensed (heard, seen, and the like) by a user of the conferencing system. As the entire buffer includes more than a single frame, the probability of an erroneous decision is reduced dramatically and another of the known shortcomings of the prior art is hence solved. Further, it may not be necessary to use the activity detection algorithm in the proposed solution if the incoming bit-stream is produced by an encoder that is operating in activity detection mode (in the case of speech this would mean "silence suppression" is being used), where a few bits in a frame header indicate if a transmitted frame has been determined to be active or inactive.

The invented algorithm then operates from the output channels' point of view. For each output channel, the source channels are all the other channels. If more than one source channel is active, then the incoming signals are mixed in the time domain and compressed using the output channel's standard. If, on the other hand, only a single source is contributing then the compressed version of that source is transcoded from the compressed input domain to the compressed output domain directly. In this way, the algorithm does not lose any information contributed to the conference, at the same time the changes required, as will be seen, are quite minimal in comparison with the use of two complete systems to carry out the functionality that are being afforded by a single system (i.e. the invented apparatus acts both as a gateway to transcode between different compression standards and a conferencing tool).

A particular advantage provided by some embodiments utilizing this approach is that these methods and systems avoid the mixing and tandeming scenario that can be so detrimental to the output quality without imposing any user end requirements and without missing any information contributed by any of the active channels.

According to other embodiments, an apparatus and method are provided that include a conferencing method that utilizes a time domain mixing path and a fast transcoding path. The method allows all signal input from the conferees to be contributed to the conference whilst allowing for fast transcoding to take place when only a single contributor is associated with a given output channel. Some embodiments of the conferencing method allow any type of compression to be used on any of the channels. The use of fast transcoding also allows for low delay conferencing most of the time. Embodiments of the conferencing method utilize activity detection algorithms to determine channel activity in combination with multi-frame buffering to allow a reduced activity detection error rate. Moreover, embodiments of the conferencing method allow a transcoded call between only two parties to become a multi-party conference and vice versa without the need to resort to separate systems to achieve both tasks.

According to an embodiment of the present invention, an apparatus for performing voice mixing of multiple inputs from multiple source bit-streams representing frames of data from a plurality of source channels is provided. Each of the plurality of source channels is connected to a conference and encoded according to a codec employed by each of the plurality of source channels. The apparatus includes a bit-stream un-packer for each of the plurality of source channels. Each of the plurality of source channels is connected to a mixing system. The apparatus also includes a voice activity detection module for each of the plurality of source channels. The voice activity detection module is adapted to determine if an input channel is active. The apparatus further includes a decision module adapted to determine if an output on a first channel of the plurality of source channels connected to the conference should be obtained through time domain mixing of time domain signals associated with other channels of the plurality of source channels or through fast transcoding of one of the other channels of the plurality of source channels, a switch module adapted to connect an input from one of the plurality of source channels to at least one of an interpolator module or a time domain mixing module based on the determined output, and an interpolator module between each of the plurality of source channels and adapted to allow speech compression parameters produced by one speech compression algorithm to cover a given time period and to represent a time period that another speech compression algorithm utilizes. Moreover, the apparatus includes a time domain mixing module for each of the plurality of source channels. The time domain mixing module is adapted to produce a time domain signal that represents a combination of the time domain signals associated with other channels of the plurality of source channels. Additionally, the apparatus includes a pack module for each of the plurality of source channels. The pack module is adapted to provide a resultant conference signal in a format associated with an output of at least one of the plurality of source channels.

According to a specific embodiment of the present invention, a method for performing voice mixing of multiple inputs from multiple source bit-streams representing frames of data from a plurality of source channels is provided. Each of the plurality of source channels is connected to a conference and encoded according to a codec employed by each of the plurality of source channels. The method includes un-packing input compression codes from the multiple source bit-streams. The multiple source bit-streams represent encoded signals. The method also includes detecting a voice activity present on each of the plurality of source channels for a pre-set time period in an adaptable manner, reconstructing time domain signals from voice active input source bit-streams that are from source channels other than a first output channel of the plurality of source channels, and mixing the reconstructed time domain signals into a mixed output signal. The method further includes generating compression codes representing the mixed output signal, interpolating input compression codes from a single voice active bit-stream from a first source channel to output compression codes to be placed on a second channel of the plurality of source channels connected to the conference when only a single source channel, other than the second, is detected to have voice activity, and packing the output compression codes in an output bit-stream formatted to represent frames of data to be placed on a channel of the plurality of source channels.

According to a particular embodiment of the present invention, a conferencing system is provided. The conferencing system is adapted to conference a number of channels such that no restrictions are placed on the type of compression used by any of the channels in that the system includes modules that can unpack bit-streams of numerous compression standards.

According to another particular embodiment of the present invention, a conferencing system that utilizes both time domain signal mixing and direct signal fast transcoding is provided. In a specific embodiment, the conferencing system is adapted to utilize both time domain signal mixing and direct signal fast transcoding to process a bit-stream from a same channel during a conference.

According to yet another particular embodiment of the present invention, a conferencing system is provided. The conferencing system allows a session which performs transcoding in code space to become a conferencing session and vice versa without the need for the conferencing and transcoding functionalities to be split between different systems.

Numerous benefits are achieved using the present invention over conventional techniques. For example, an embodiment allows channels to carry signals in any format without the need for direct tandeming of encoders. Moreover, in another embodiment, the quality and complexity advantages of both time domain mixing and conferencing through controlled switching are provided by allowing fast transcoding when there is only one speaker and all speakers to be heard when more than a single speaker is active. Depending upon the embodiment, one or more of these benefits may exist. These and other benefits have been described throughout the present specification and more particularly below. Various additional objects, features, and advantages of the present invention, which are believed to be novel, are set forth with particularity in the appended claims. Embodiments of the present invention, both as to their organization and manner of operation, together with further objects and advantages, may best be understood by reference to the following description, taken in connection with the accompanying drawings.

BRIEF DESCRIPTION OF THE DRAWINGS

For a more complete understanding of the present invention, reference to the detailed description and claims should be considered along with the following illustrative figures, wherein the same reference numbers refer to similar elements throughout the figures.

DETAILED DESCRIPTION OF SPECIFIC EMBODIMENTS

Embodiments of the present invention provide methods and systems applicable to speech conferencing. Numerous benefits are provided by embodiments of the present invention, including the following:

1. Conferencing without a loss in quality or a loss in information;
2. Conferencing without placing restrictions on the user equipment, meaning that the operator should not be concerned with the user equipment to be able to implement the proposed solution; and
3. Achieving the above goals without an unwarranted increase in complexity and overall cost per conference.

A method and apparatus in accordance with embodiments of the present invention are discussed in detail below. In the following description, for purposes of explanation, numerous specific details are set forth in order to provide a thorough understanding of the present invention. A person skilled in the art will recognize that other steps and applications than those listed here as examples are possible without departing from the spirit of the present invention.

Figure 1:
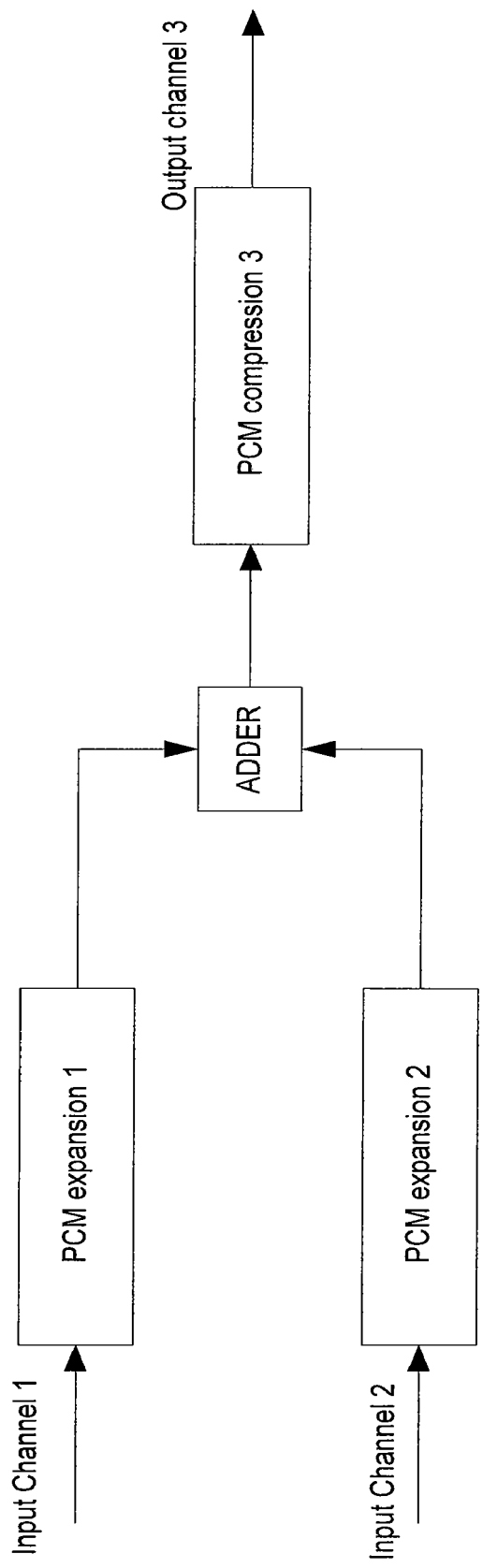
FIG. 1 is a block diagram representation of prior art Pulse Code Modulation (PCM) based conferencing.
Figure 2:
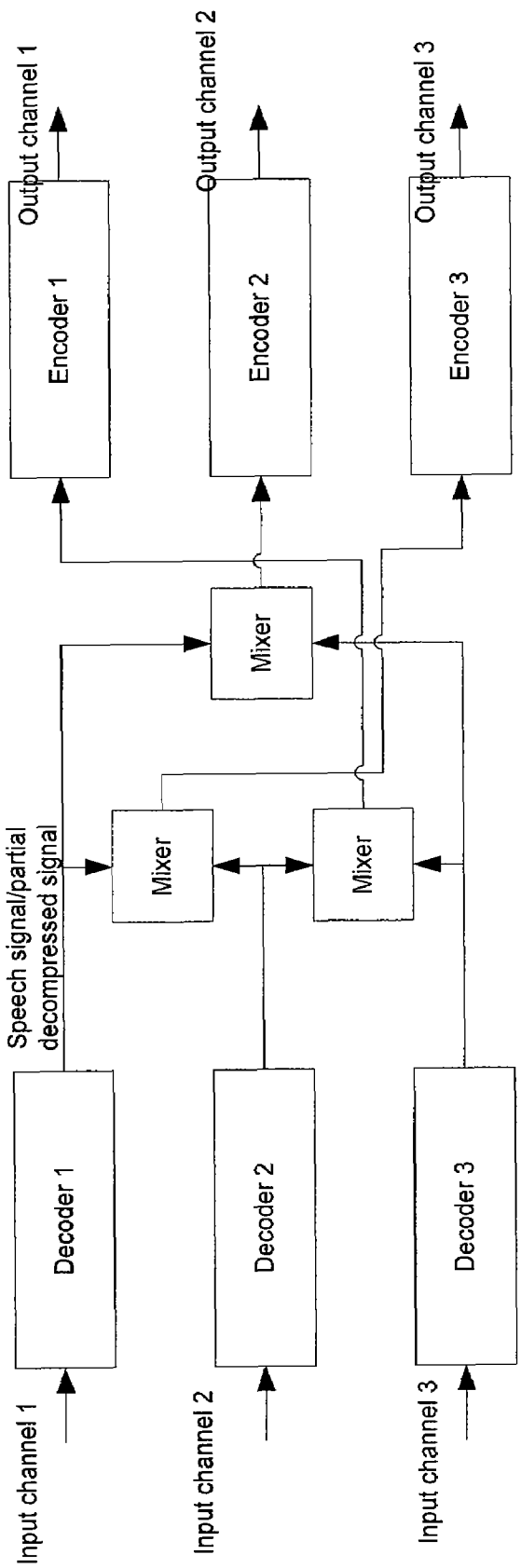
FIG. 2 is a block diagram representation of a prior art apparatus that conferences channels using different compression methods by addition in the time domain.
Figure 3:
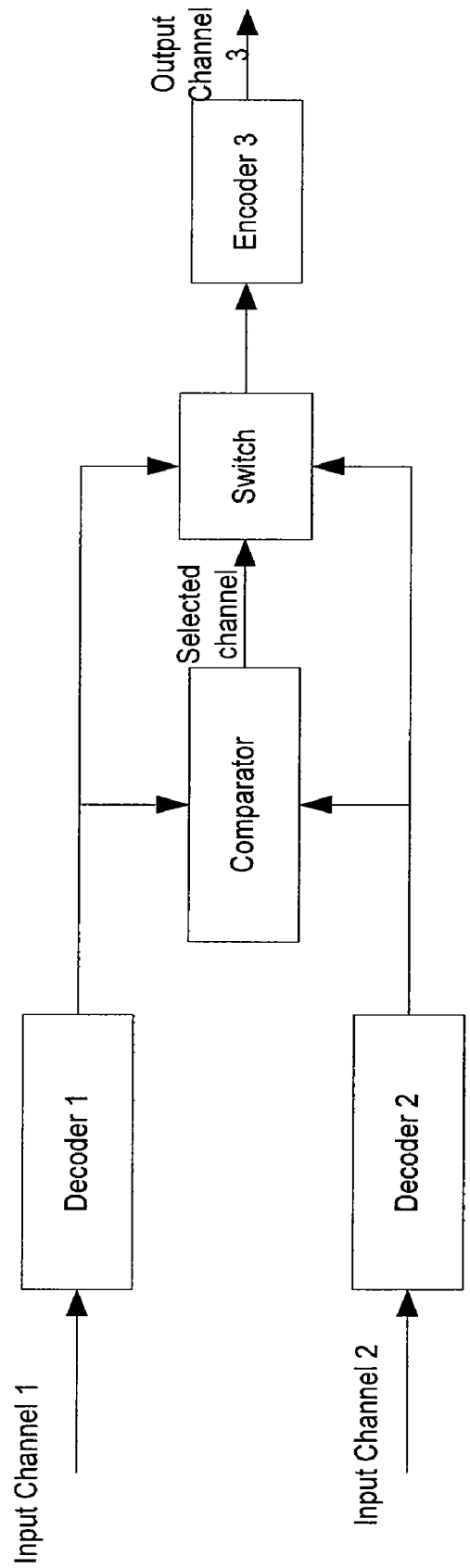
FIG. 3 is a block diagram representation of a conferencing apparatus that employs a speaker selection method to perform conferencing.
Figure 4:
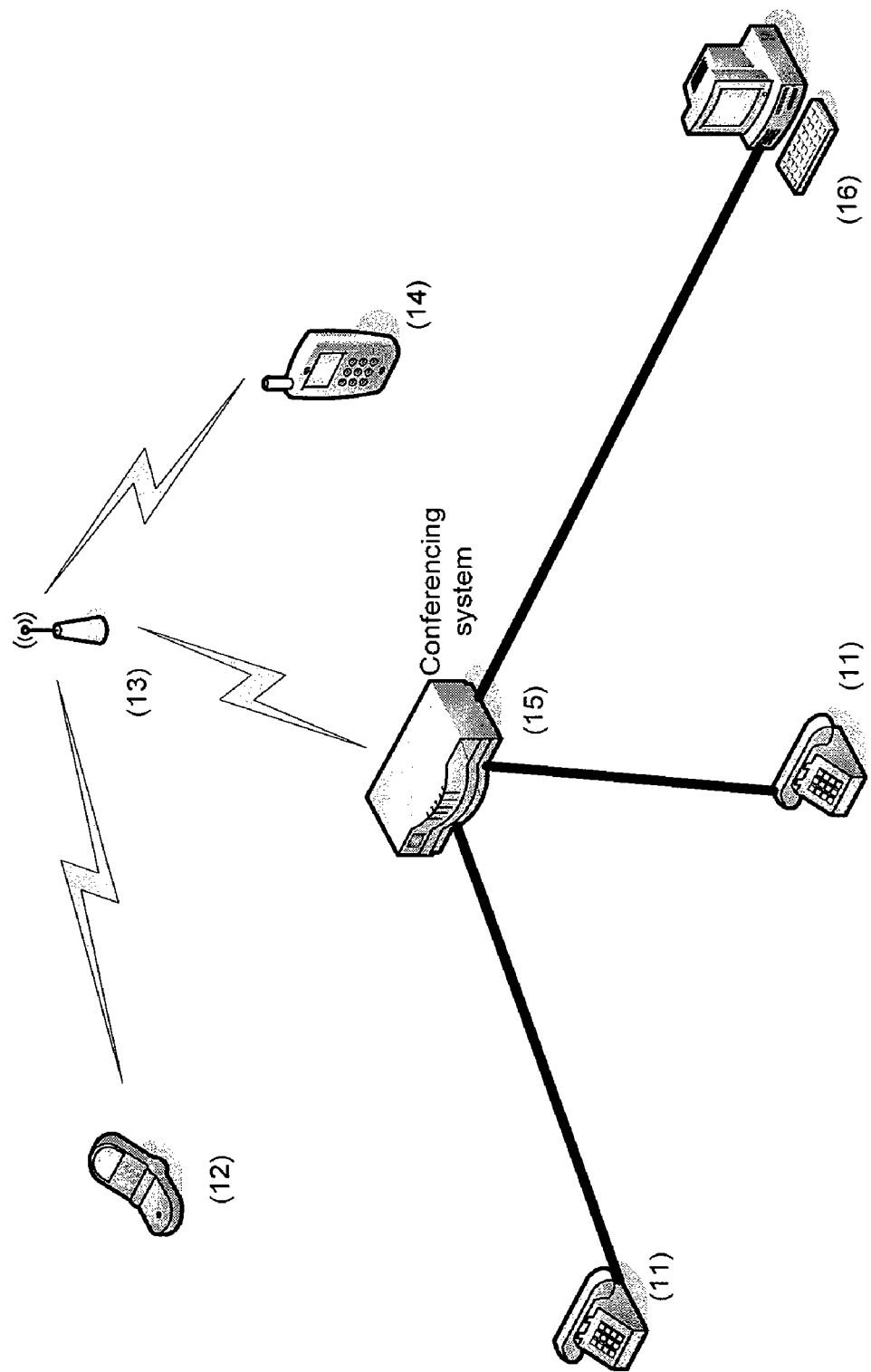
FIG. 4 is an illustration of a conference setup that would utilize the current invention housed in a network element to allow conferees from multiple networks to conference through the use of a single network element.
Figure 5A:
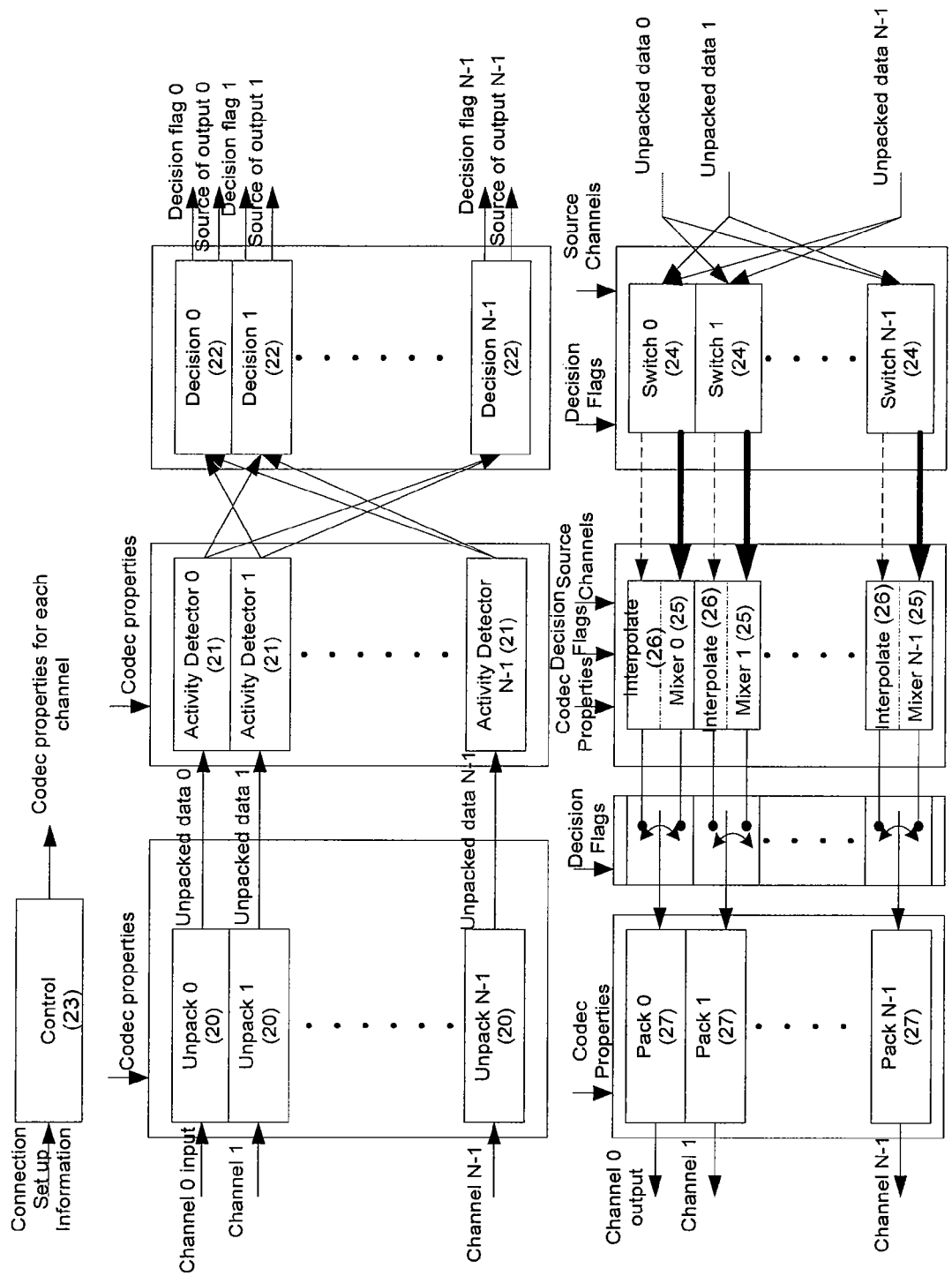
FIG. 5A is a block diagram representation of a preferred embodiment of the invented apparatus.
Figure 6A:
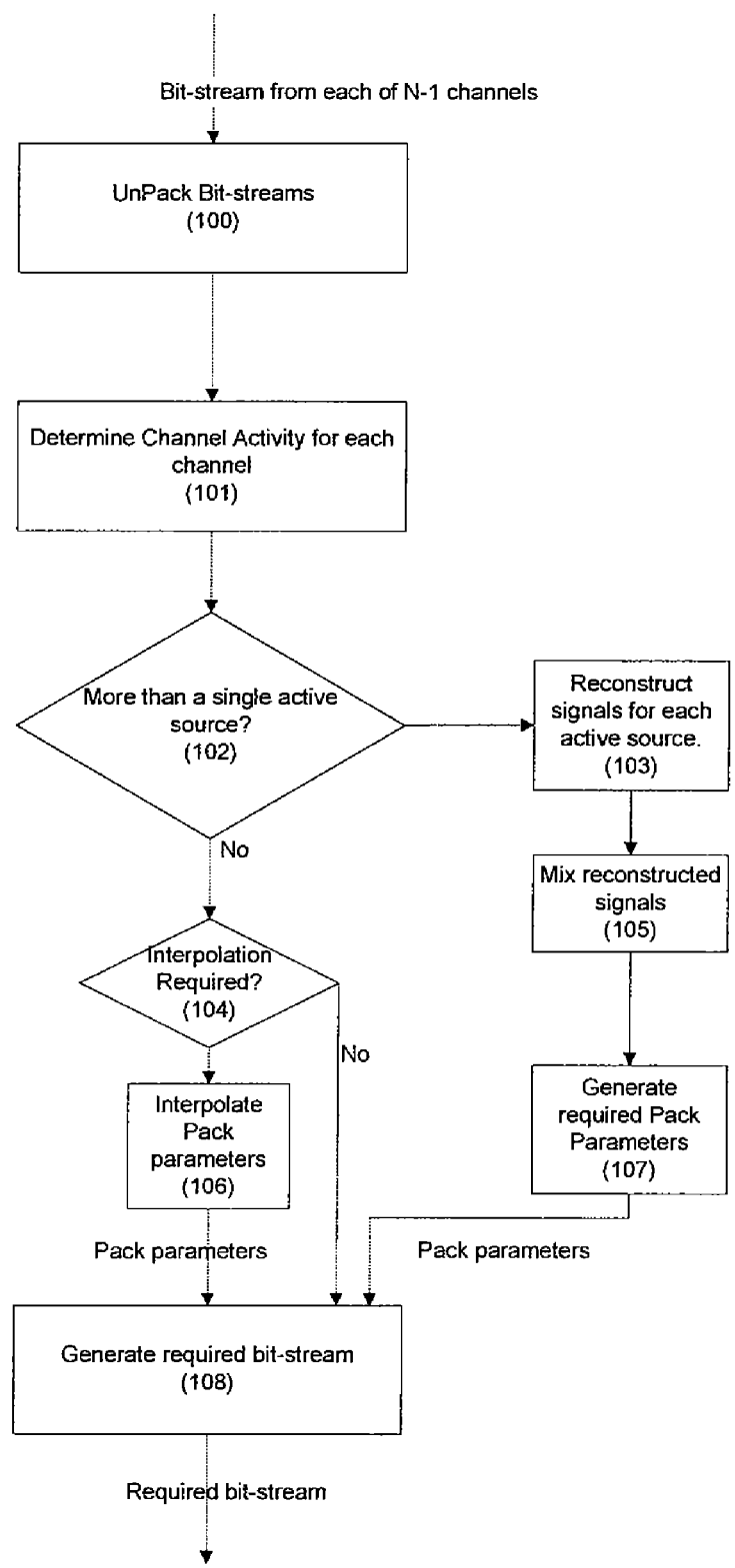
FIG. 6A is a block diagram representation of a method of generating a conference output for each participating channel.

FIG. 5A shows an embodiment of the invented apparatus in full. FIG. 6A shows a method of generating an output to each participant according to an embodiment of the present invention in full. For each output channel, there are N-1 possible input channels, where there are N channels joined in a conference. Each contributing channel's input is passed through a relevant unpack module 20 (an example of a relevant unpack module would be one selected based on a compression scheme used) and then through a relevant activity detection module 21 (it may be the same activity detection method, with history and other parameters that need to be maintained per channel is used for all input channels or a different detection method may be used for each contributing channel). If more than a single channel is active, as determined by 22, then a signal for each channel is re-constructed if need be in 59 (i.e. if it has not been reconstructed yet for use with an activity detection module). Having a reconstructed signal of each channel, a time domain mixer 25 is used to generate a combined signal which is in turn used to generate the required packed parameters through the use of 27.

If only a single channel is active, a determination is made on whether or not interpolation of parameters is required using 24 (for example, this may be necessary when input parameters represent a different length of time to that expected for output parameters). If it is needed, then packed parameters are generated through interpolation in 26, otherwise input parameters are sent to a relevant pack module 27.

A relevant pack module for each channel may be chosen depending on the type of coder that the output channel employs. History of the channel states is updated as an output bit-stream is generated.

It should be appreciated that the specific steps illustrated in FIG. 6A provide a particular method of generating an output to each participant according to an embodiment of the present invention. Other sequences of steps may also be performed according to alternative embodiments. For example, alternative embodiments of the present invention may perform the steps outlined above in a different order. Moreover, the individual steps illustrated in FIG. 6A may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 6B:
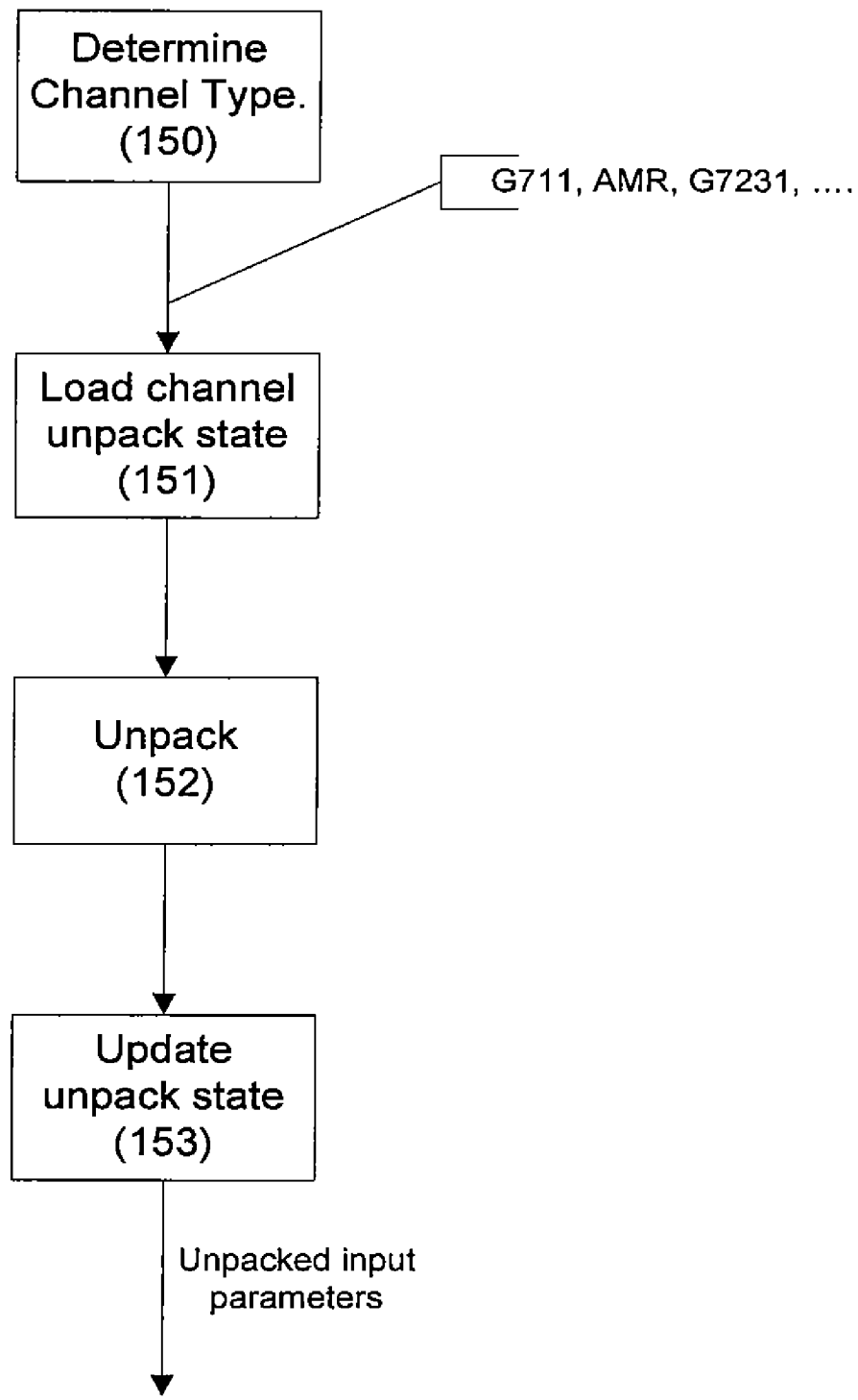
FIG. 6B is a block diagram representation of a method of unpacking input data from participating channels.

FIG. 6B illustrates operation of an unpack method according to an embodiment of the present invention. For each input channel, the codec used by that channel is determined (150) and the state is loaded for that channel (151). The state contains information such as a history of any filters used, previous signal information and the like. The method is generic in its structure such that any type of signal compression algorithm may be used. The unpack method would then differ in complexity for each type of coder used as would the amount of information contained in the state. It should be pointed out that the length of unpacked samples (in terms of time) is the same for all input channels in a preferred embodiment although this is not absolutely necessary and the over-all structure of the method or apparatus would not change if this were not the case.

For each channel input, the unpacked parameters are fed into "activity detection modules" 21, as shown in FIG. 5A. If an input channel utilizes a coder that indicates activity or inactivity on the line (for example, GSM-AMR for speech) and this option is being used (as determined by 200 FIG. 6C) then an activity detection algorithm could not be used again, rather the decision of the original encoder could be trusted. If no such indication is carried by the input coder bit-stream (this could be because this option has not been implemented by the vendor or has not been turned on by the user end-point) then the signal needs to be reconstructed from input parameters using 59. This action is not a necessity as some activity detection algorithms (such as that described in U.S. Patent Application No. 20050102137) only require unpacked parameters to determine whether a channel is active.

It should be appreciated that the specific steps illustrated in FIG. 6B provide a particular method of unpacking according to an embodiment of the present invention. Other sequences of steps may also be performed according to alternative embodiments. For example, alternative embodiments of the present invention may perform the steps outlined above in a different order. Moreover, the individual steps illustrated in FIG. 6B may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 6C:
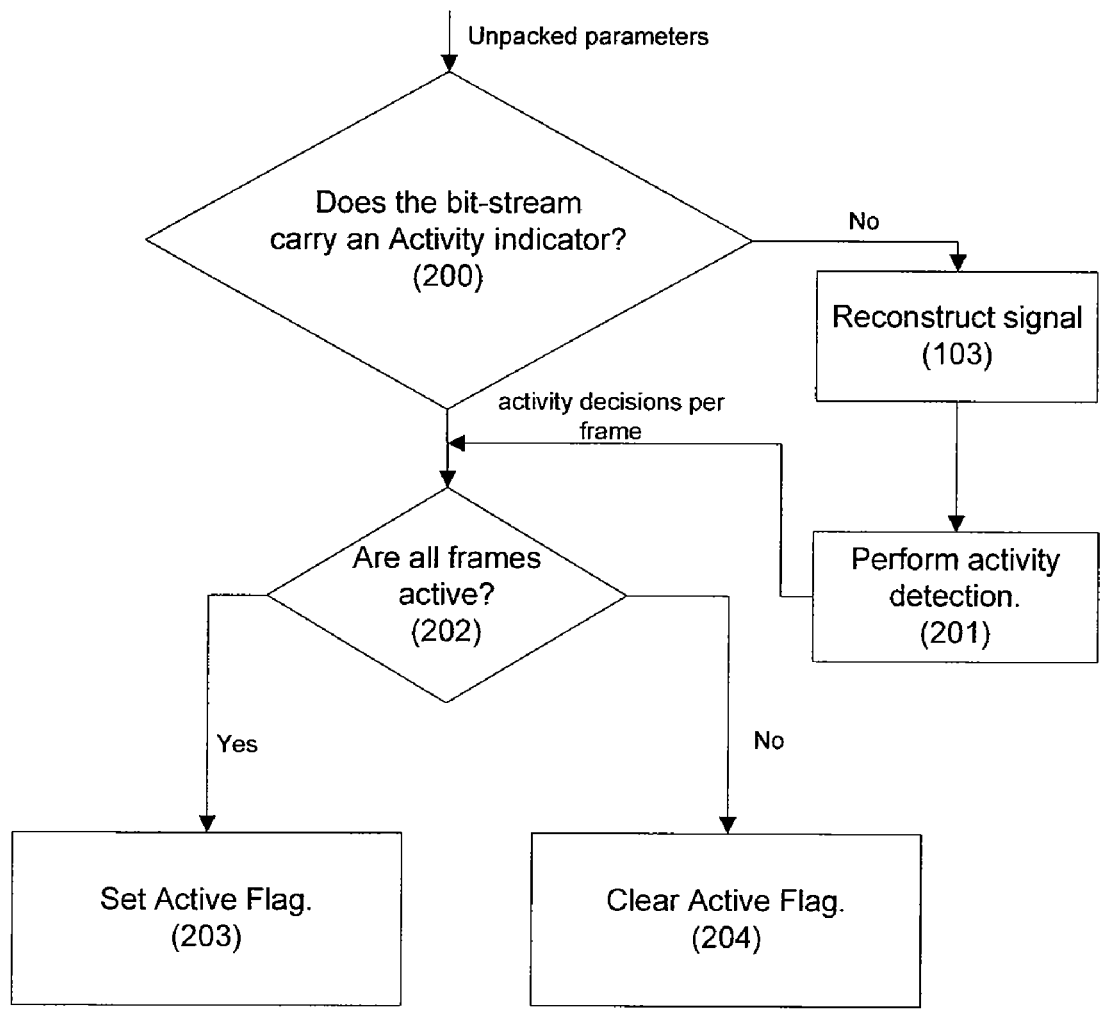
FIG. 6C is a block diagram representation of a method of channel activity detection in a conference output generating method.

Having made activity decisions for each signal segment (a signal segment is made up of multiple frames) input per channel, then the active input flag for each input channel is set only if all input frames in that segment are active frames (FIG. 6C modules 202, 203 and 204). Use of a signal segment rather than a single frame in the decision is to reduce chances of erroneous active decisions being made. As every detection algorithm has some probability of erroneous activity recognition (P(E)), and activity detection algorithms are designed such that any error is active biased (it errs to indicate the presence of activity where there is no activity and not otherwise) it is beneficial to use more than a single frame in an activity detection decision. This will reduce the error of the algorithm used to $P(E)^M$ where M is the number of frames used in the segment. Clearly, this is a much lower error than the single frame case (as all probabilities have a value between 0 and 1).

Figure 5B:
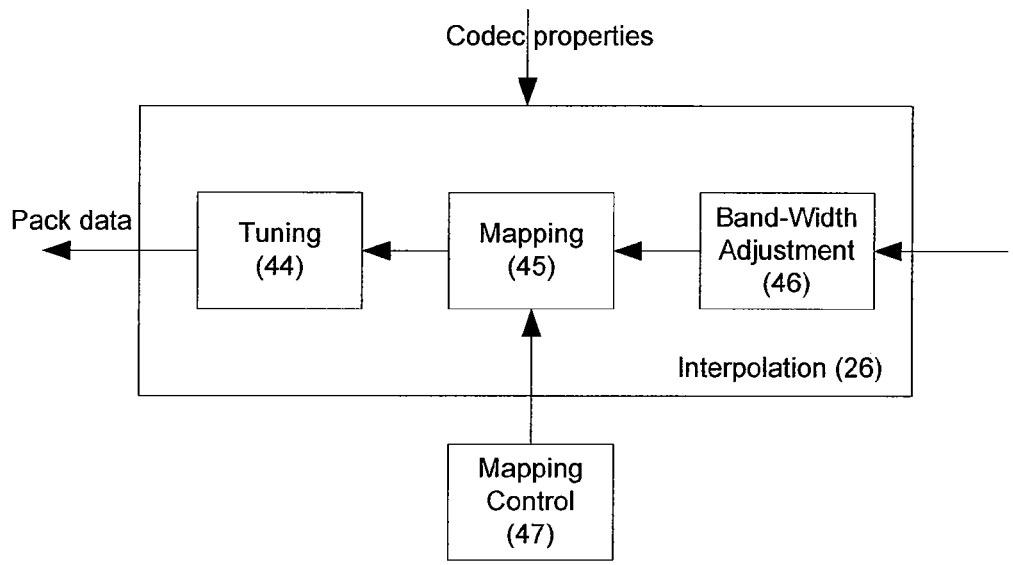
FIG. 5B is a block diagram representation of an interpolation apparatus used in an embodiment of the invented conferencing apparatus.
Figure 5C:
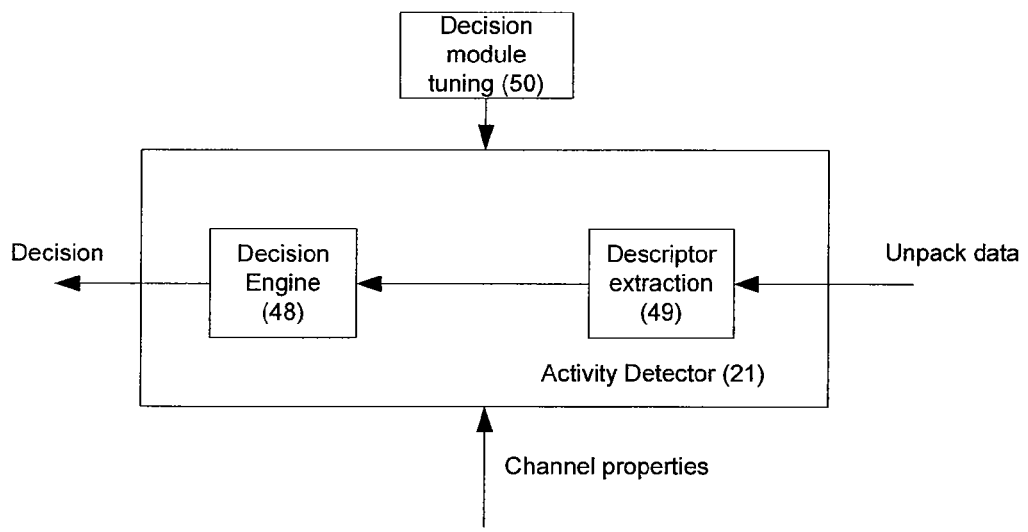
FIG. 5C is a block diagram representation of a channel activity detection apparatus used in an embodiment of the invented conferencing apparatus.
Figure 5D:
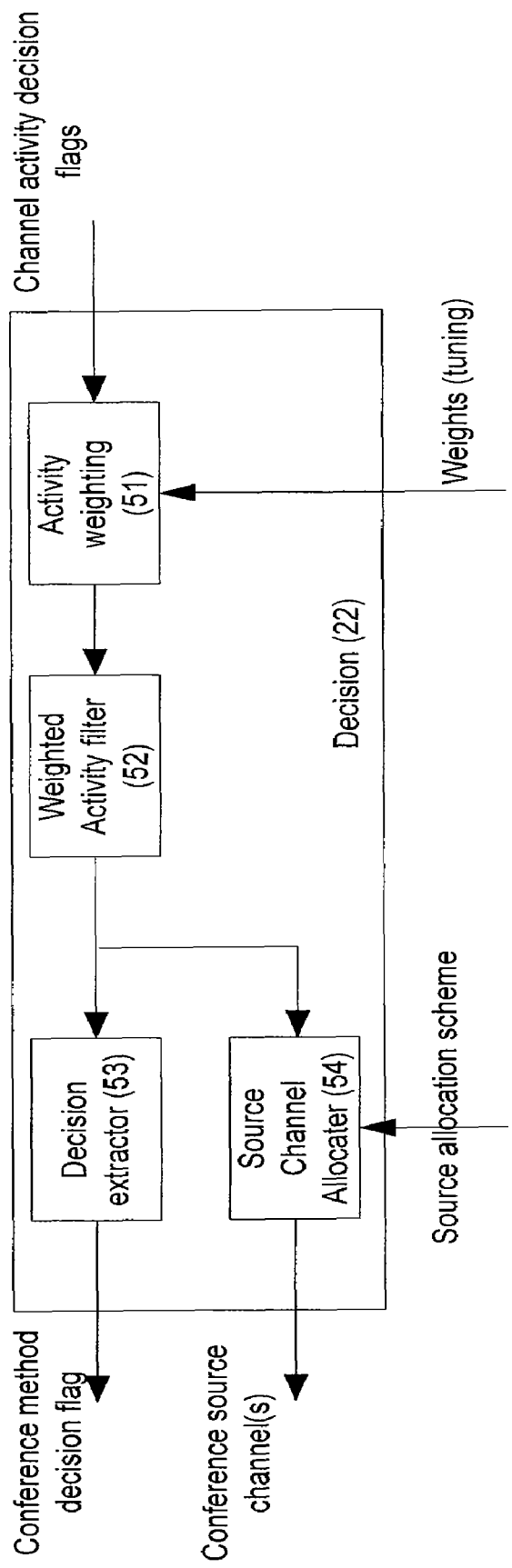
FIG. 5D is a block diagram representation of a decision making apparatus used in an embodiment of the invented conferencing apparatus.

Once an active flag has been set or cleared for each input channel, a decision on which method to be used to generate the output as well as which source channels to use is made in 22. FIG. 5D shows the apparatus used to generate the required decision and source channel information. A weighting is applied to the activity flags by 51, this weighting may be pre-determined or adaptively determined. Weighted activity flags are then filtered in 52 to allow 53 to extract an appropriate decision. Filtered weighted activity flags are also used to determine which contributing channels are source channels (a source channel is one that supplies an output channel with a signal) by source channel identifier 54. The difference between each path is covered in what follows.

Figure 5E:
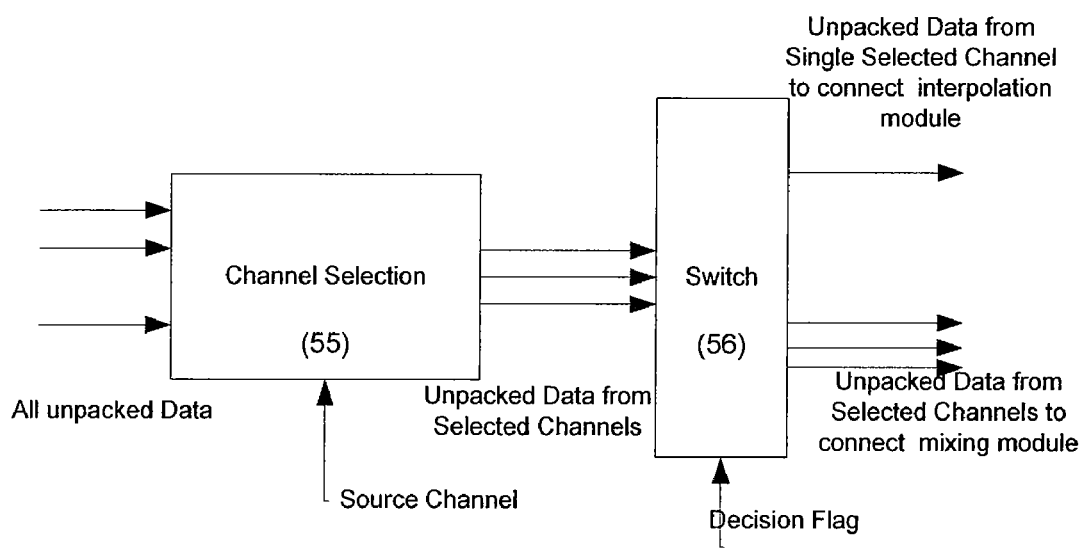
FIG. 5E is a block diagram representation of a method used in an embodiment of the invented conferencing apparatus to connect relevant unpacked data to an output generating module.
Figure 5F:
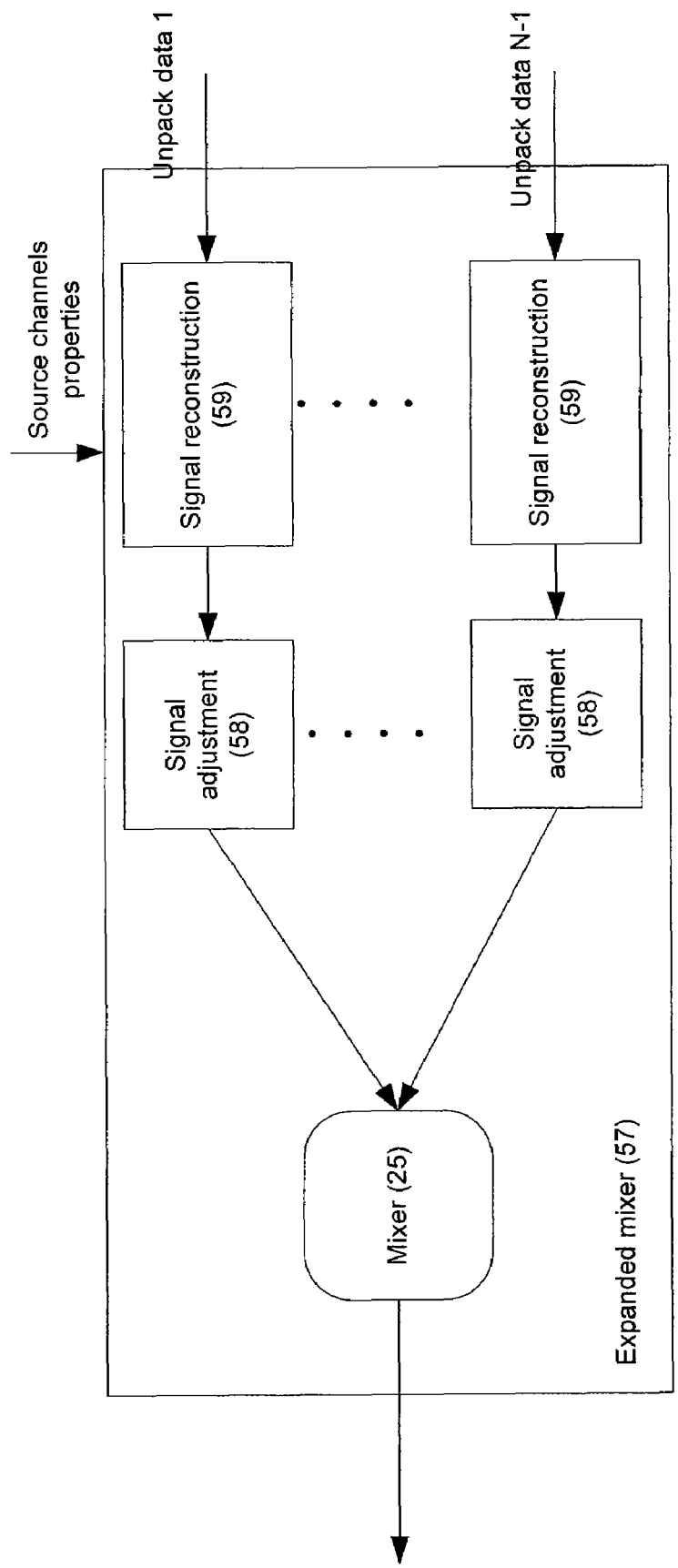
FIG. 5F is a block diagram representation of a mixing apparatus in an embodiment of the invented conferencing apparatus allowing for signal reconstruction and adjustment.
Figure 5G:
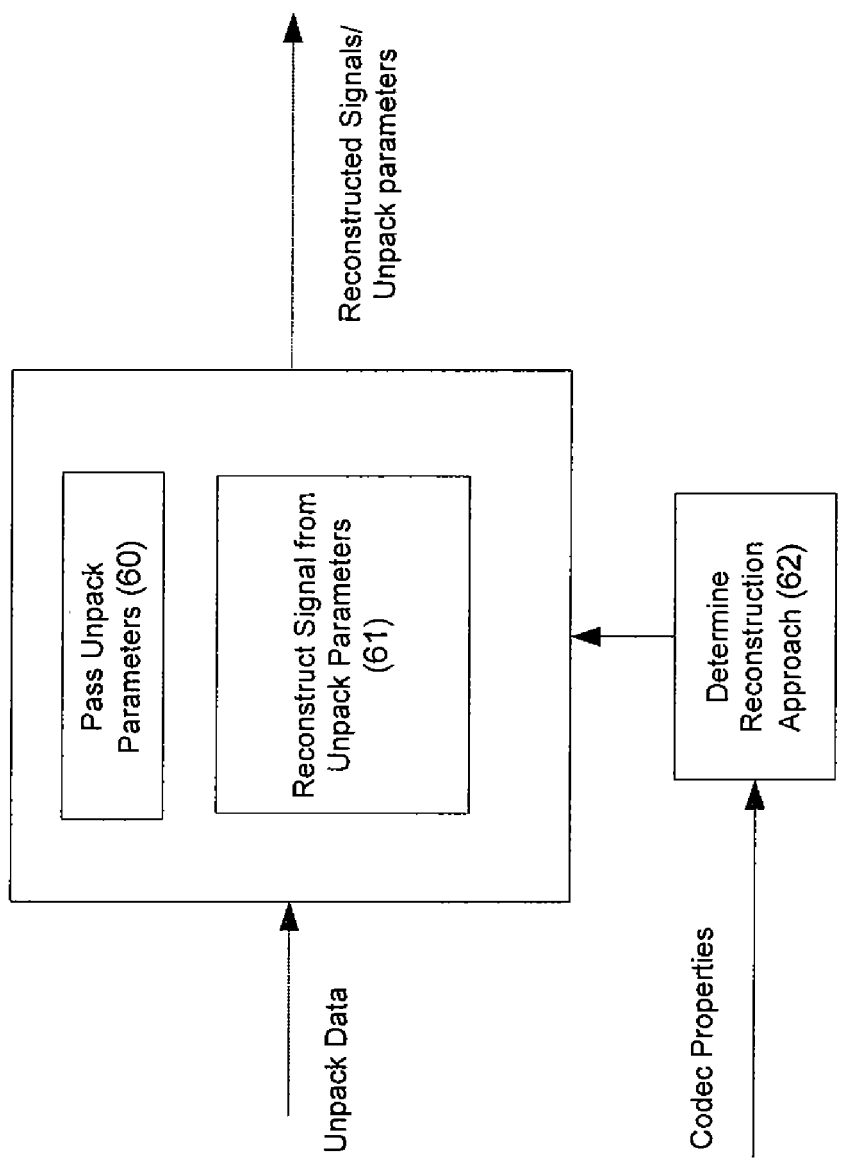
FIG. 5G is a block diagram representation of a method used in an embodiment of the invented apparatus to determine what information to be passed to the mixer and to generate time domain representation if necessary.
Figure 5H:
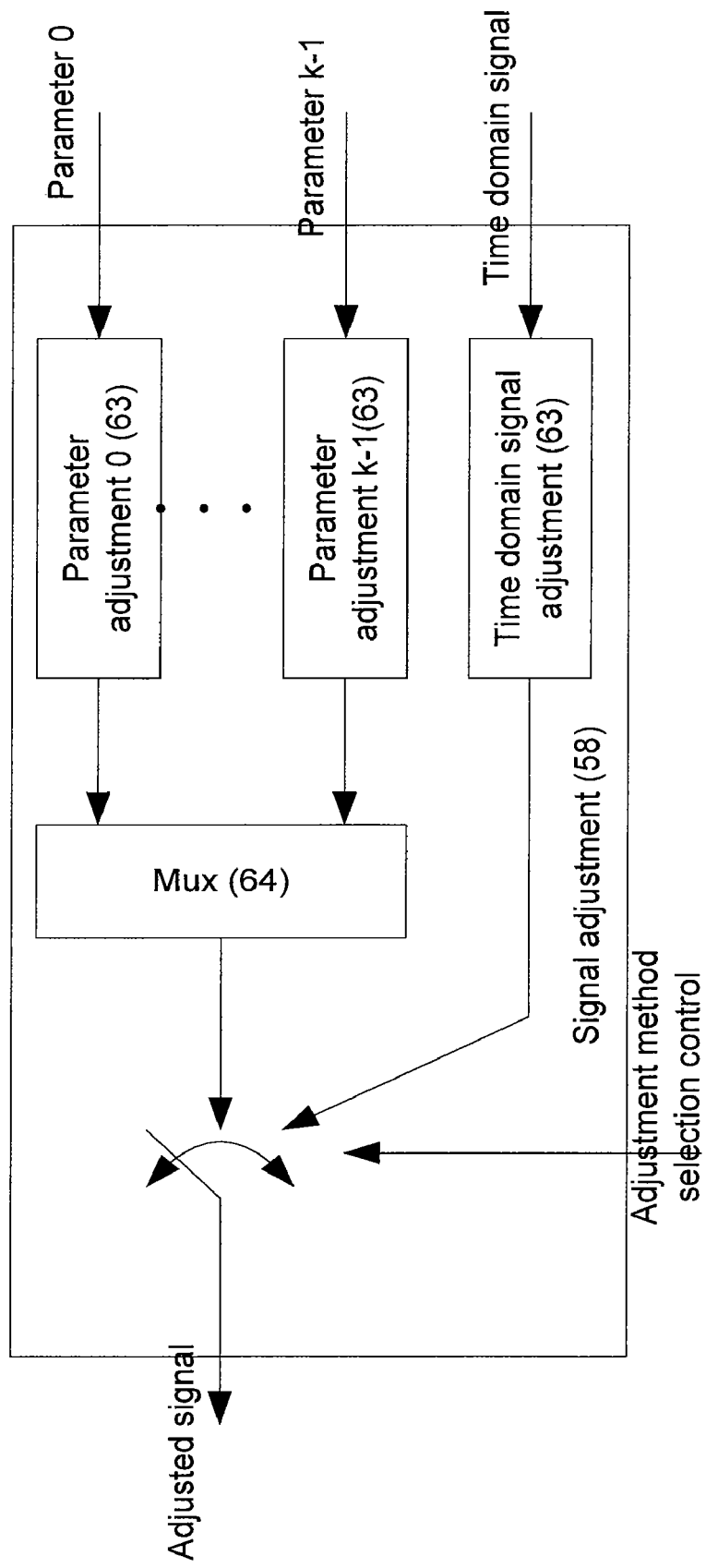
FIG. 5H is a block diagram representation of a signal adjustment apparatus in an embodiment of the invented conferencing apparatus.

FIG. 5F and FIG. 5H illustrate components of the time domain mixing path according to an embodiment of the present invention. Signal reconstruction may be carried out using 59 that will re-generate the compressed input source signals. Signal adjustment 58 allows the to be mixed signals to be modified to system requirements and finally mixing is carried out on the modified reconstructed signals using the mixer 25. Signal adjustment is a generic method of allowing the system to condition the re-generated signals to allow mixing to be performed. The method of adjustment may be a simple pass-through (i.e. no actual adjustment) or much more complicated methods of adjustment. Signal adjustment 58 can be carried out in parametric or time domains as shown by FIG. 5H. In a preferred embodiment, the original signal is assumed to exist in the time domain (as do all speech signals) and its representation to exist in the parametric domain (as for example in CELP compression). In one embodiment, the mixer 25 is a time domain adder, however other embodiments are possible where the mixer is in fact a parametric adder or a hybrid (both time and parametric) adder.

Figure 6D:
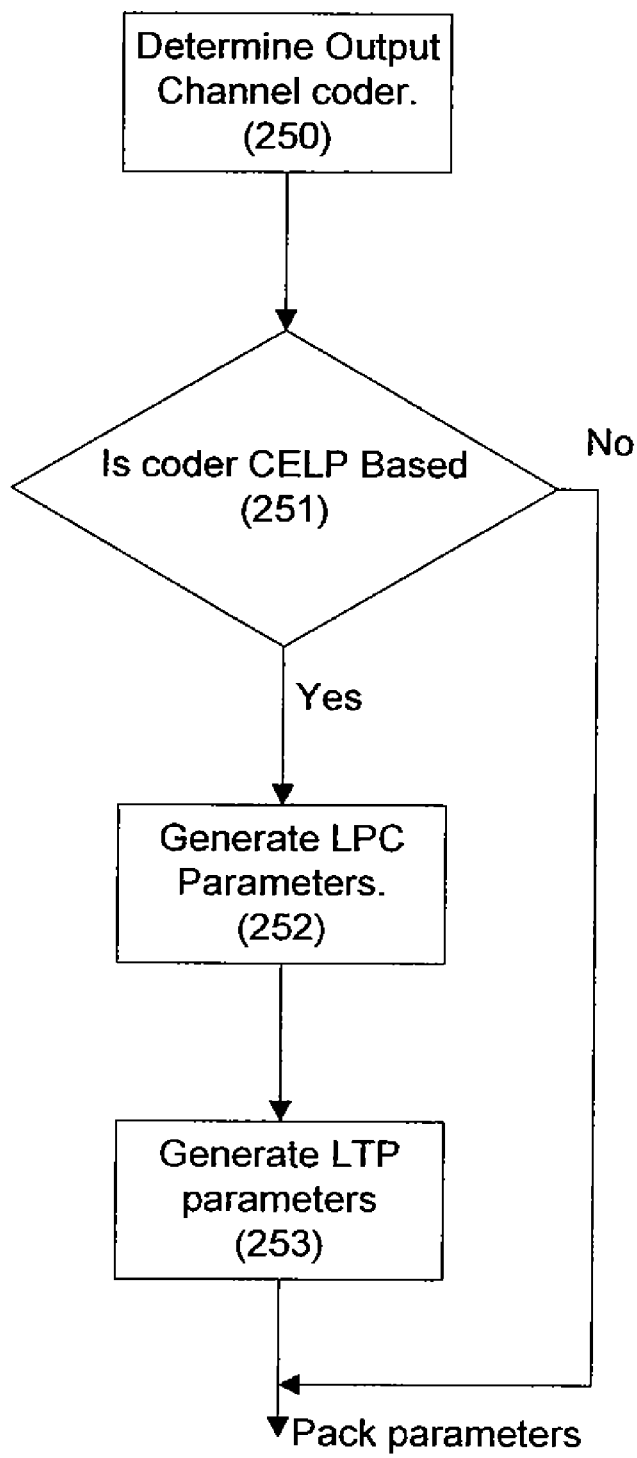
FIG. 6D is a block diagram representation of a method used to generate pack data when an output channel utilizes a CELP based compression algorithm.

FIG. 6D shows a method used to perform the unpack operation used by an apparatus provided by an embodiment of the present invention. When speech is the input signal, as in an embodiment, if the output speech coder is a CELP based coder, then LPC parameters and LTP (Long Term Predictor) parameters are determined using an LPC parameter generator 252 and an LTP parameter generator 253. LPC parameters are short term predictor parameters whereas LTP parameters are long term prediction parameters. Both sets of parameters are well known to practitioners in the field of speech coding. Such parameters are used by the pack module as the wrap module should be able to handle inputs from both a CELP parameter interpolation module and a time domain based module.

A CELP domain fast transcoding path is selected in a particular embodiment when there is only a single speaker and thus saving on the need to generate the speech signal (if none has been generated for the activity detection algorithm application) as well as a possibility of reduced quality incurred in a time domain mixing path. This is clearly a faster path (in terms of complexity) as it involves just the interpolator 26 (FIG. 5B illustrates the interpolation apparatus whereas FIG. 5E shows the method used to determine how input channels should be directed), if it is required (e.g., when an input frame length is different to an output frame length).

From an implementation point of view, it is easier to have input frames buffered such that there is no need for a further wait to generate the required output, although this is not absolutely necessary.

Once the pack parameters have been generated by either path in the algorithm, the pack modules 27 are used to generate the bit-streams for transmission on each output channel as well as to update the history of the pack operations.

It should be appreciated that the specific steps illustrated in FIG. 6D provide a particular method of performing an unpack operation according to an embodiment of the present invention. Other sequences of steps may also be performed according to alternative embodiments. For example, alternative embodiments of the present invention may perform the steps outlined above in a different order. Moreover, the individual steps illustrated in FIG. 6A may include multiple sub-steps that may be performed in various sequences as appropriate to the individual step. Furthermore, additional steps may be added or removed depending on the particular applications. One of ordinary skill in the art would recognize many variations, modifications, and alternatives.

According to an embodiment of the present invention, a method for performing voice mixing of multiple inputs from multiple source bit-streams representing frames of data from a plurality of source channels is provided. Each of the plurality of source channels is connected to a conference and encoded according to a codec employed by each of the plurality of source channels. The method includes un-packing input compression codes from the multiple source bit-streams. The multiple source bit-streams represent encoded signals.

In one embodiment, un-packing the input compression codes includes converting an input bit-stream frame into information associated with one or more speech parameters, decoding the information into one or more speech parameters, and reconstructing time domain speech samples and parameters based on the one or more speech parameters. Merely by way of example, the speech parameters may be CELP parameters if the codec employs a CELP voice compression method and the speech parameters may be non-CELP parameters if the codec employs a non-CELP voice compression method.

The method also includes detecting a voice activity present on each of the plurality of source channels for a pre-set time period in an adaptable manner. As an example, detecting a voice activity may include determining if an input bit-stream carries a voice activity indicator for each time frame represented by the input bit-stream, reconstructing a time domain signal from the un-packed input compression codes if the input bit-stream does not carry a voice activity indicator, processing the time domain signal, if reconstructed, to determine if the time domain signal has voice activity for the time frame and generating the voice activity indicator for the time frame, and using voice activity indicators of multiple consecutive time frames to set or clear an active flag indicating if each of the plurality of source channels has voice activity.

The method further includes reconstructing time domain signals from voice active input source bit-streams that are from source channels other than a first output channel of the plurality of source channels and mixing the reconstructed time domain signals into a mixed output signal. In a specific embodiment, mixing the reconstructed time domain signals includes reconstructing time sampled speech parameters from the un-packed input compression codes, modifying the reconstructed speech parameters according to a control input, regenerating speech signals from the unpacked and reconstructed parameters if required, and mixing sample-based speech parameters from multiple source inputs to produce a combined time-sampled set of parameters.

Moreover, the method includes generating compression codes representing the mixed output signal. In an embodiment, generating compression codes includes quantizing all destination speech codec parameters in a target code space and generating silence description frames that use less bits than normal coded speech frames when only silence is to be transmitted to the output bit-stream.

Additionally, the method includes interpolating input compression codes from a single voice active bit-stream from a first source channel to output compression codes to be placed on a second channel of the plurality of source channels connected to the conference when only a single source channel, other than the second, is detected to have voice activity. As an example, interpolating input compression codes may include interpolating CELP parameters including LSPs, adaptive codebook, and fixed codebook parameters according to an output channel CELP format and frame size, converting CELP parameters from narrow-band to wide-band if the input compression codes represent a narrow-band signal and the output compression codes are to represent a wide-band signal, and converting CELP parameters from wide-band to narrow-band if the input compression codes represent a wide-band signal and the output compression codes are to represent a narrow-band signal. Moreover, interpolating input compression codes may also include converting the input compression codes to CELP compression codes if the input compression codes are not CELP compression codes and the output compression codes are to be formatted as CELP compression codes, converting the input compression codes from CELP compression codes to non-CELP compression codes if the output compression codes are to be formatted as non-CELP compression codes, directly passing through the input compression codes as the output compression codes if the output channel carries the same type of compression codes as the input compression codes, and storing speech parameters used for interpolation in a next time frame into a buffer.

In an embodiment, converting CELP parameters from wide-band to narrow-band includes converting LPC coefficients from a wide-band representation to a narrow-band representation, bandwidth limiting and down-sampling time sampled parameters from wide-band to narrow-band, and interpolating all other CELP parameters in wide-band form to narrow-band form. In another embodiment, converting CELP parameters from narrow-band to wideband includes converting LPC coefficients from a narrow-band representation to a wide-band representation, band-limiting and up-sampling time sampled parameters from narrow-band to wideband, and interpolating all other CELP parameters in narrow-band form to wide-band form.

The method additionally includes packing the output compression codes in an output bit-stream formatted to represent frames of data to be placed on a channel of the plurality of source channels. In a particular embodiment, packing the output compression codes includes determining a format to be used for a first channel of the plurality of channels connected to the conference and formatting the generated compression codes according to the determined format.

It should be appreciated that the specific steps discussed above provide a particular method of performing voice mixing of multiple inputs from multiple source bit-streams representing frames of data from a plurality of source channels according to an embodiment of the present invention. Other sequences of steps may also be performed according to alternative embodiments. For example, alternative embodiments of the present invention may perform the steps outlined above in a different order. Moreover, the individual steps discussed above may include multiple sub-steps that may be performed in various sequences as appropriate to the individual step. Furthermore, additional steps may be added or removed depending on the particular applications. One of ordinary skill in the art would recognize many variations, modifications, and alternatives.

From the preceding description, a number of advantages of the invented conferencing apparatus and method become apparent. These advantages include:

(a) The apparatus and method provided by embodiments of the present invention allows channels to carry signals in any format without the need for direct tandeming of encoders;

(b) Embodiments of the present invention combine the quality and complexity advantages of both time domain mixing and conferencing through controlled switching by allowing fast transcoding when there is only one speaker and all speakers to be heard when more than a single speaker is active;

(c) Embodiments of the present invention treat each output channel independently allowing both fast transcoding and time domain mixing to be used at any given point in time simultaneously;

(d) Embodiments of the present invention utilize signal segments that are multi-framed to make an activity decision on each channel, allowing for a significant reduction in the error involved in determining each channel's activity;

(e) Embodiments of the present invention allow activity detection to be generic in that the detection method is allowed to change and so the conferencing apparatus described allows non-speech signals to be conferenced as long as a sufficient definition of signal activity is provided; and (f) Embodiments of the present invention allow for signal modification during conferencing that is both parametric and time domain oriented, allowing for certain signal characteristics (for example, the tone of a voice) to be manipulated.

According to an embodiment of the present invention, an apparatus for performing voice mixing of multiple inputs from multiple source bit-streams representing frames of data from a plurality of source channels is provided. Each of the plurality of source channels is connected to a conference and encoded according to a codec employed by each of the plurality of source channels. The source bit-streams may represent CELP parameters, narrow-band speech, or wide-band speech.

The apparatus includes a bit-stream un-packer for each of the plurality of source channels. In an embodiment, each of the plurality of source channels is connected to a mixing system. In a specific embodiment, the bit-stream un-packer includes a bit-stream data type identifier adapted to receive an input from a bit-stream frame of data encoded by a voice codec according to a voice compression standard and adapted to output a data type of the packet and a source bit-stream payload data unquantizer adapted to dequantize codes representing one or more speech compression parameters. As an example, the source bit-stream payload data unquantizer may includes a code separator operative to receive input from a bit-stream frame of data encoded at a data rate according to a voice compression standard and to interpret the codes representing the one or more speech parameters, at least one dequantizer module operative to dequantize the codes representing the one or more speech compression parameters, and a code index pass-through module operative to pass input codes representing the one or more speech compression parameters to following stages.

The apparatus also includes a voice activity detection module for each of the plurality of source channels. The voice activity detection module is adapted to determine if an input channel is active. In an embodiment, the voice activity detection module includes a silence frame detection state machine adapted to store a voice activity status of several past frames, a silence frame indicator adapted to indicate a silence status of a current frame from one or more speech compression parameters carried by one of the multiple source bit-streams, and a voice activity detector adapted to perform a voice activity computation from unpacked speech parameters and output the voice activity status.

The apparatus further includes a decision module adapted to determine if an output on a first channel of the plurality of source channels connected to the conference should be obtained through time domain mixing of time domain signals associated with other channels of the plurality of source channels or through fast transcoding of one of the other channels of the plurality of source channels. As an example, the decision module may includes an activity weighting module operative to weight a voice activity status of one or more source channels of the plurality of source channels according to a set of one or more tuning weights assigned by a system hosting the conference or a participant in the conference. In a specific embodiment, the set or one of more tuning weights are assigned automatically. The decision module may also include a weighted activity filter operative to combine the weighted voice activity status of the one or more source channels of the plurality of source channels, a decision extractor operative to produce a flag indicating a conference method to be used to produce the output on the first channel of the plurality of source channels, and a source channel allocater operative to use the filtered weighted voice activity status of the one or more source channels of the plurality of source channels and a source allocation scheme to determine which of the plurality of source channels will contribute to the output of the first channel of the plurality of source channels.

Moreover, the apparatus includes a switch module adapted to connect an input from one of the plurality of source channels to at least one of an interpolator module or a time domain mixing module based on the determined output and an interpolator module between each of the plurality of source channels and adapted to allow speech compression parameters produced by one speech compression algorithm to cover a given time period and to represent a time period that another speech compression algorithm utilizes. In a specific embodiment, the interpolator module includes a CELP parameters interpolation module adapted to interpolate LSPs, adaptive codebook parameters, and fixed codebook parameters to represent different length speech frames or to define speech frames using a different combination of these parameters to that presented by CELP parameters operated on, a bandwidth adjustment module adapted to convert narrow-band parameters to wide-band parameters and wide-band parameters to narrow-band parameters, and a pass-through module if a source channel speech compression method and an output channel speech compression method are the same. The interpolation module also includes a non-CELP to CELP parameter interpolation module adapted to convert non-CELP compression parameters into a set of CELP parameters if the source channel compression method is a non-CELP type compression method and the output channel compression method is a CELP type compression method, a CELP to non-CELP parameter interpolation module adapted to convert CELP parameters to non-CELP parameters if the source channel compression method is a CELP type compression method and the output channel compression method is a non-CELP compression method, and a CELP parameter buffer adapted to store one or more CELP parameters that are not interpolated and hold the one or more CELP parameters that are not interpolated until there is a difference between the source channel compression method and the output channel compression method.

In a particular embodiment, the bandwidth adjustment module includes an LPC conversion module adapted to extend narrow-band LPC to wideband LPC, an up-sampling module adapted to convert time sampled parameters from narrow-band to wide-band, and a CELP parameter equivalent conversion module adapted to interpolate other CELP parameters from narrow-band to wide-band. In another particular embodiment, the bandwidth adjustment module includes an LPC conversion module adapted to convert wide-band LPC to narrow-band LPC, a down-sampling module adapted to convert time sampled parameters from wide-band to narrow-band, and a CELP parameter equivalent conversion module adapted to interpolate other CELP parameters from wide-band to narrow-band.

The apparatus also includes a time domain mixing module for each of the plurality of source channels. The time domain mixing module is adapted to produce a time domain signal that represents a combination of the time domain signals associated with other channels of the plurality of source channels. In some embodiments, the time domain mixing module includes a plurality of signal reconstruction modules. Each of the signal reconstruction module is associated with each of the plurality of source channels and adapted to provide a time domain digital speech signal using a set of parameters describing a compression method used on the first channel of the plurality of source channels and another set of parameters obtained from the bit-stream un-packer for the first channel of the plurality of source channels. In other embodiments, each of the signal reconstruction modules further includes a re-sampling module adapted to convert wideband digital speech signals to narrow band digital speech signals or to convert narrow-band digital speech signals to wide-band digital speech signals.

The time domain mixing module also includes a mixer module adapted to combine time domain digital speech signals produced by the plurality of signal reconstruction modules.

In a specific embodiment the apparatus includes an optional scaling module adapted to normalize the time domain digital speech signal to avoid overflow and an optional signal adjustment module adapted to allow the time domain digital speech signals to be modified before being combined.

The apparatus additionally includes a pack module for each of the plurality of source channels. The pack module is adapted to provide a resultant conference signal in a format associated with an output of at least one of the plurality of source channels. For example, the format associated with the output may include a compression algorithm. In a specific embodiment, the pack module includes a tuning module comprising a decision module adapted to select a destination compression method parameter mapping and a tuning strategy based upon a plurality of strategies, a tuning module adapted to output one or more destination CELP parameters if an output channel compression method is a CELP type speech compression method, and a non-CELP type tuning module adapted to output the one or more destination CELP compression parameters if the output channel compression method is a non-CELP type speech compression method.

In another embodiment, the pack module includes a plurality of frame packing facilities. Each of the plurality of frame packing facilities is capable of adapting to a pre-selected application from a plurality of applications for a selected destination voice coder. The selected destination voice coder is one of a plurality of voice coders. In yet another embodiment, the apparatus is configurable to allow more than two bit-streams to be accepted as source bit-streams. As an example, a compression method used on any of the plurality of source channels includes at least one of a parametric speech compression method, a waveform-approximating speech compression method, or a waveform compression method. As another example, the compression method used on any of the plurality of source channels may include any speech or audio compression method. Merely by way of example, a source channel compression method and an output channel compression method may include wide-band and narrow-band methods.

According to an embodiment of the present invention, a conferencing system adapted to conference a number of channels is provided. The conferencing is adapted such that no restrictions are placed on the type of compression used by any of the channels in that the system includes modules that can unpack bit-streams of numerous compression standards. By way of example, type of compression includes parametric speech compression methods, waveform-approximating methods, waveform compression methods, and audio compression methods. In another example, the type of compression includes narrow-band compression and wide-band compression.

According to another embodiment of the present invention, a conferencing system that utilizes both time domain signal mixing and direct signal fast transcoding is provided. Some embodiments utilize both time domain signal mixing and direct signal fast transcoding to process a bit-stream from a same channel during a conference.

Moreover, an embodiment provides a conferencing system that allows a session which performs transcoding in code space to become a conferencing session and vice versa without the need for the conferencing and transcoding functionalities to be split between different systems.

Although the above description has many specifics, these should not be interpreted as limiting the scope of the present invention but as merely providing an example embodiment of the invention. For example, no signal adjustment may be required and so this element may be discarded; a history or record module may be included to allow for conference record keeping; a data sharing module may also be included and the like.

The scope of the invention should, therefore, be determined with reference to the appended claims along with their full scope of legal equivalents, rather than by the embodiments described.

What is claimed is:

1. An apparatus for performing voice mixing of multiple inputs from multiple source bit-streams representing frames of data from a plurality of source channels, each of the plurality of source channels being connected to a conference and encoded according to a codec employed by each of the plurality of source channels, the apparatus comprising:
   a bit-stream un-packer for each of the plurality of source channels, each of the plurality of source channels being connected to a mixing system;
   a voice activity detection module for each of the plurality of source channels, wherein the voice activity detection module is adapted to determine if an input channel is active;

a decision module adapted to determine if an output on a first channel of the plurality of source channels connected to the conference should be obtained through time domain mixing of time domain signals associated with other channels of the plurality of source channels or through fast transcoding of one of the other channels of the plurality of source channels;

a switch module adapted to connect an input from one of the plurality of source channels to at least one of an interpolator module or a time domain mixing module based on the determined output;

an interpolator module between each of the plurality of source channels and adapted to allow speech compression parameters produced by one speech compression algorithm to cover a given time period and to represent a time period that another speech compression algorithm utilizes;

a time domain mixing module for each of the plurality of source channels, wherein the time domain mixing module is adapted to produce a time domain signal that represents a combination of the time domain signals associated with other channels of the plurality of source channels; and a pack module for each of the plurality of source channels, wherein the pack module is adapted to provide a resultant conference signal in a format associated with an output of at least one of the plurality of source channels.

2. The apparatus of claim 1 wherein one or more of the multiple source bit-streams represent CELP parameters.

3. The apparatus of claim 1 wherein one or more of the multiple source bit-streams represent narrow-band speech.

4. The apparatus of claim 1 wherein one or more of the multiple source bit-streams represent wide-band speech.

5. The apparatus of claim 1 wherein the apparatus is configurable to allow more than two bit-streams to be accepted as source bit-streams.

6. The apparatus of claim 1 wherein the codec employed by each of the plurality of source channels comprises at least one of a parametric speech compression method, a waveform-approximating speech compression method, or a waveform compression method.

7. The apparatus of claim 1 wherein the codec employed by each of the plurality of source channels comprises a speech compression method or an audio compression method.

8. A method for performing voice mixing of multiple inputs from multiple source bit-streams representing frames of data from a plurality of source channels, each of the plurality of source channels being connected to a conference and encoded according to a codec employed by each of the plurality of source channels, the method comprising:

un-packing input compression codes from the multiple source bit-streams, wherein the multiple source bit-streams represent encoded signals;

detecting a voice activity present on each of the plurality of source channels for a pre-set time period in an adaptable manner;

reconstructing time domain signals from voice active input source bit-streams that are from source channels other than a first output channel of the plurality of source channels;

mixing the time domain signals into a mixed output signal;

generating output compression codes representing the mixed output signal;

interpolating input compression codes from a single voice active bit-stream from a first source channel to the output compression codes to be placed on a second channel of the plurality of source channels connected to the conference when only a single source channel, other than the second, is detected to have voice activity; and packing the output compression codes in an output bit-stream formatted to represent frames of data to be placed on a channel of the plurality of source channels.

9. The method of claim 8 wherein un-packing input compression codes comprises:

decoding an input bit-stream frame into one or more speech parameters; and reconstructing time domain speech samples and parameters based on the one or more speech parameters.

10. The method of claim 9 wherein the one or more speech parameters are CELP parameters.

11. The method of claim 9 wherein the one or more speech parameters are non-CELP parameters.

12. The method of claim 8 wherein detecting a voice activity comprises:

determining if a frame in an input bit-stream carries a voice activity indicator;

reconstructing a time domain signal from un-packed input compression codes if the frame does not carry the voice activity indicator;

processing the time domain signal to determine if the time domain signal has voice activity producing a produced voice activity indicator for the frame; and using the produced voice activity indicator to set or clear an active flag indicating has voice activity.

13. The method of claim 8 wherein interpolating input compression codes comprises:

interpolating CELP parameters including LSPs, adaptive codebook, and fixed codebook parameters according to an output channel CELP format and frame size;

converting CELP parameters from narrow-band to wide-band if the input compression codes represent a narrow-band signal and the output compression codes are to represent a wide-band signal;

converting CELP parameters from wide-band to narrow-band if the input compression codes represent a wide-band signal and the output compression codes are to represent a narrow-band signal;

converting the input compression codes to CELP compression codes if the input compression codes are not CELP compression codes and the output compression codes are to be formatted as CELP compression codes;

converting the input compression codes from CELP compression codes to non-CELP compression codes if the output compression codes are to be formatted as non-CELP compression codes;

directly passing through the input compression codes as the output compression codes if the output channel carries the same type of compression codes as the input compression codes; and storing speech parameters used for interpolation in a next time frame into a buffer.

14. The method of claim 13 wherein converting CELP parameters from wide-band to narrow-band comprises:

converting LPC coefficients from a wide-band representation to a narrow-band representation;

bandwidth limiting and down-sampling time sampled parameters from wide-band to narrow-band; and interpolating all other CELP parameters in wide-band form to narrow-band form.

15. The method of claim 13 wherein converting CELP parameters from narrow-band to wideband comprises:

converting LPC coefficients from a narrow-band representation to a wide-band representation;

band-limiting and up-sampling time sampled parameters from narrow-band to wideband; and interpolating all other CELP parameters in narrow-band form to wide-band form.

16. The method of claim 8 wherein mixing the time domain signals into a mixed output signal comprises:

modifying the time domain signals to sample-based speech parameters according to a control input; and mixing the sample-based speech parameters from multiple source inputs to produce the mixed output signal.

17. The method of claim 8 wherein generating output compression codes comprises:

quantizing all destination speech codec parameters in a target code space; and generating silence description frames that use less bits than normal coded speech frames when only silence is to be transmitted to the output bit-stream.

18. The method of claim 8 wherein packing the output compression codes comprises:

determining a format to be used for a first channel of the plurality of channels connected to the conference; and formatting the output compression codes according to the format.

19. An apparatus for performing audio mixing in a conference call among at least a first participant, a second participant, and a third participant, wherein the first participant is associated with a first input channel formatted according to a first codec, the second participant is associated with a second input channel formatted according to a second codec, and the third participant is associated with a third output channel formatted according to a third codec, the apparatus comprising:

a first bitstream un-packer coupled to the first input channel, the first bit-stream un-packer being adapted to extract one or more first audio compression parameters of the first input channel;

a second bitstream un-packer coupled to the second input channel, the second bitstream un-packer being adapted to extra one or more second audio compression parameters of the second input channel;

a first voice activity detection module coupled to the first bitstream un-packer, the first voice activity detection module being adapted to determine if the first input channel is active;

a second voice activity detection module coupled to the second bitstream un-packer, the second voice activity detection module being adapted to determine if the second input channel is active;

a decision module coupled to the first voice activity detection module and the second voice activity detection module, the decision module being associated with the third output channel, the decision module being adapted to determine if the third output channel should be obtained through a time domain mixing of time domain signals associated with the first input channel and the second input channel, or through a first transcoding process from the first input channel to the third output channel, or through a second transcoding process from the second input channel to the third output channel;

an interpolator module coupled to the decision module, the interpolator module being adapted to get one or more interpolated audio compression parameters by utilizing either the first transcoding process or the second transcoding process, wherein the one more interpolated audio compression parameters are associated with the third output channel;

a time domain mixing module coupled to the decision module, the time domain mixing module being adapted to produce a time domain signal associated with the third output channel; and a pack module coupled to the decision module, the interpolator module, the time domain mixing module, and the third output channel, the pack module being adapted to provide a resultant conferencing signal in a format according to the third codec.

20. The apparatus of claim 19 wherein the first bit-stream un-packer comprises:

a bit-stream data type identifier adapted to receive an input from a bit-stream frame of data encoded by a voice codec according to a voice compression standard and adapted to output a data type of the packet; and a source bit-stream payload data unquantizer adapted to dequantize codes representing one or more speech compression parameters.

21. The apparatus of claim 20 wherein the source bit-stream payload data unquantizer comprises:

a code separator, the code separator being operative to receive input from a bit-stream frame of data encoded at a data rate according to a voice compression standard and to interpret the codes representing the one or more speech parameters;

at least one dequantizer module operative to dequantize the codes representing the one or more speech compression parameters; and a code index pass-through module operative to pass input codes representing the one or more speech compression parameters to following stages.

22. The apparatus of claim 19 wherein the first voice activity detection module includes:

a silence frame detection state machine adapted to store a voice activity status of several past frames;

a silence frame indicator adapted to indicate a silence status of a current frame from one or more speech compression parameters carried by a source bit-stream; and a voice activity detector adapted to perform a voice activity computation from unpacked speech parameters and output the voice activity status.

23. The apparatus of claim 19 wherein the decision module comprises:

an activity weighting module operative to weight a voice activity status of one or more source channels according to a set of one or more tuning weights assigned by a system hosting the conference or a participant in the conference;

a weighted activity filter operative to combine a weighted voice activity of the one or more source channels;

a decision extractor operative to produce a flag indicating a conference method to be used to produce the third output channel; and a source channel allocater operative to use a filtered weighted voice activity status of the one or more source channels and a source allocation scheme to determine which of the one or more source channels will contribute to the third output channel.

24. The apparatus of claim 23 wherein the set of one or more tuning weights are assigned automatically.

25. The apparatus of claim 19 wherein the time domain mixing module comprises:

a first signal reconstruction module associated with the first input channel adapted to provide a first time domain digital speech signal using a first set of parameters describing a compression method used on the first input channel and a first additional set of parameters obtained from the first bit-stream un-packer;

a second signal reconstruction module associated with the second input channel adapted to provide a second time domain digital speech signal using a second set of parameters describing a compression method used on the second input channel and a second additional set of parameters obtained from the second bit-stream un-packer; and a mixer module adapted to combine the first time domain digital speech signal and the second time domain digital speech signal.

26. The apparatus of claim 25 further comprising:

an optional scaling module adapted to normalize the first time domain digital speech signal to avoid overflow; and an optional signal adjustment module adapted to allow the first time domain digital speech signal to be modified before being combined.

27. The apparatus of claim 25 wherein the first signal reconstruction module further includes a re-sampling module adapted to convert wideband digital speech signals to narrow band digital speech signals or to convert narrow-band digital speech signals to wide-band digital speech signals.

28. The apparatus of claim 19 wherein the interpolator module comprises:

a CELP parameter interpolation module adapted to interpolate one or more of LSPs, adaptive codebook parameters, and fixed codebook parameters if a difference exists between one or more of a source frame size and an output frame size, and a source subframe size and an output subframe size;

a bandwidth adjustment module adapted to convert narrow-band parameters to wide-band parameters and wide-band parameters to narrow-band parameters;

a pass-through module adapted to pass-through data if a source channel speech compression method and an output channel speech compression method are a same method;

a non-CELP to CELP parameter interpolation module adapted to convert non-CELP compression parameters into a set of CELP parameters if a source channel speech compression method is a non-CELP compression method and an output channel speech compression method is a CELP compression method;

a CELP to non-CELP parameter interpolation module adapted to convert CELP parameters to non-CELP parameters if a source channel speech compression method is a CELP compression method and an output channel speech compression method is a non-CELP compression method; and a CELP parameter buffer adapted to:
store one or more CELP parameters that are not interpolated; and
hold the one or more CELP parameters that are not interpolated until there is a difference between a source channel speech compression method and an output channel speech compression method.

29. The apparatus of claim 28 wherein the bandwidth adjustment module comprises:

an LPC conversion module adapted to extend narrow-band LPC to wideband LPC;

an up-sampling module adapted to convert time sampled parameters from narrow-band to wide-band; and a CELP parameter equivalent conversion module adapted to interpolate other CELP parameters from narrow-band to wide-band.

30. The apparatus of claim 28 wherein the bandwidth adjustment module comprises:

an LPC conversion module adapted to convert wide-band LPC to narrow-band LPC;

a down-sampling module adapted to convert time sampled parameters from wide-band to narrow-band; and a CELP parameter equivalent conversion module adapted to interpolate other CELP parameters from wide-band to narrow-band.

31. The apparatus of claim 19 wherein the pack module comprises a tuning module, the tuning module comprising:

a tuning decision module adapted to select a destination compression method parameter mapping and a tuning strategy selected from a plurality of strategies;

a CELP tuning module adapted to output one or more destination CELP parameters if an output channel compression method is a CELP speech compression method; and a non-CELP tuning module adapted to output one or more destination non-CELP compression parameters if an output channel compression method is a non-CELP speech compression method.

32. The apparatus of claim 19 wherein the pack module comprises a plurality of frame packing facilities, each of the plurality of frame packing facilities being capable of adapting to a pre-selected application from a plurality of applications for a selected destination voice coder.

33. The apparatus of claim 19 wherein the conference call comprises at least three or more participants.

34. The apparatus of claim 19 wherein the resultant conferencing signal comprises one or more silence description frames.

35. The apparatus of claim 19 wherein the decision module further consists of a controlling module allowing only either a first transcoding process from the first input channel to the third output channel, or a second transcoding process from the second input channel to the third output channel when the first input channel is detected as being voice active and the second input channel is detected as being voice active.

36. A method for performing audio mixing in a conference call among at least a first participant, a second participant, and a third participant, wherein the first participant is associated with a first input channel formatted according to a first codec, the second participant is associated with a second input channel formatted according to a second codec, and the third participant is associated with a third output channel formatted according to a third codec, the method comprising:

processing an input bit-stream received through the first input channel to produce one or more first audio compression parameters, and an input bit-stream received through the second input channel to produce one or more second audio compression parameters;

detecting a first voice activity status on the first input channel and a second voice activity status on the second input channel;

determining if the third output channel should be obtained through a time domain audio mixing of time domain signals associated with the first input channel and the second input channel, or through a transcoding process when only one of the first input channel and the second input channel is detected to have voice activity;

providing one or more interpolated audio compression parameters from either interpolating the one or more first audio compression parameters, or interpolating the one or more second audio compression parameters;

reconstructing a first time domain signal of the first input channel and a second time domain signal of the second input channel;

mixing the first time domain signal and the second time domain signal into a mixed time domain signal;

generating one or more mixed audio compression parameters from the mixed time domain signal; and packing the one or more interpolated audio compression parameters or the one or more mixed audio compression parameters to an output bit-stream in a format of the third codec.

37. The method of claim 36 wherein the detecting a first voice activity status comprises detecting inactive frames of an input bit-stream.

38. The method of claim 36 wherein detecting a first voice activity status comprises:

determining if a frame in an input bit-stream carries a voice activity indicator;

reconstructing a time domain signal from un-packed input compression codes if the frame does not carry the voice activity indicator;

processing the time domain signal to determine if the time domain signal has voice activity and producing a voice activity indicator for the frame; and using the produced voice activity indicator to set or clear an active flag indicating voice activity.

39. The method of claim 36 wherein interpolating the one or more first audio compression parameters comprises:

interpolating CELP parameters including LSPs, adaptive codebook, and fixed codebook parameters according to an output channel CELP format and frame size;

converting CELP parameters from narrow-band to wide-band if the input compression codes represent a narrow-band signal and the output compression codes are to represent a wide-band signal;

converting CELP parameters from wide-band to narrow-band if the input compression codes represent a wide-band signal and the output compression codes are to represent a narrow-band signal;

converting the input compression codes to CELP compression codes if the input compression codes are not CELP compression codes and the output compression codes are to be formatted as CELP compression codes;

converting the input compression codes from CELP compression codes to non-CELP compression codes if the output compression codes are to be formatted as non-CELP compression codes;

directly passing through the input compression codes as the output compression codes if the output channel carries the same type of compression codes as the input compression codes; and storing speech parameters used for interpolation in a next time frame into a buffer.

* * * * *